May 1, 1923.
C. S. STEVENS
1,453,859
MILK PRODUCT AND PROCESS OF MAKING THE SAME
Filed Aug. 7, 1918
2 Sheets-Sheet 1
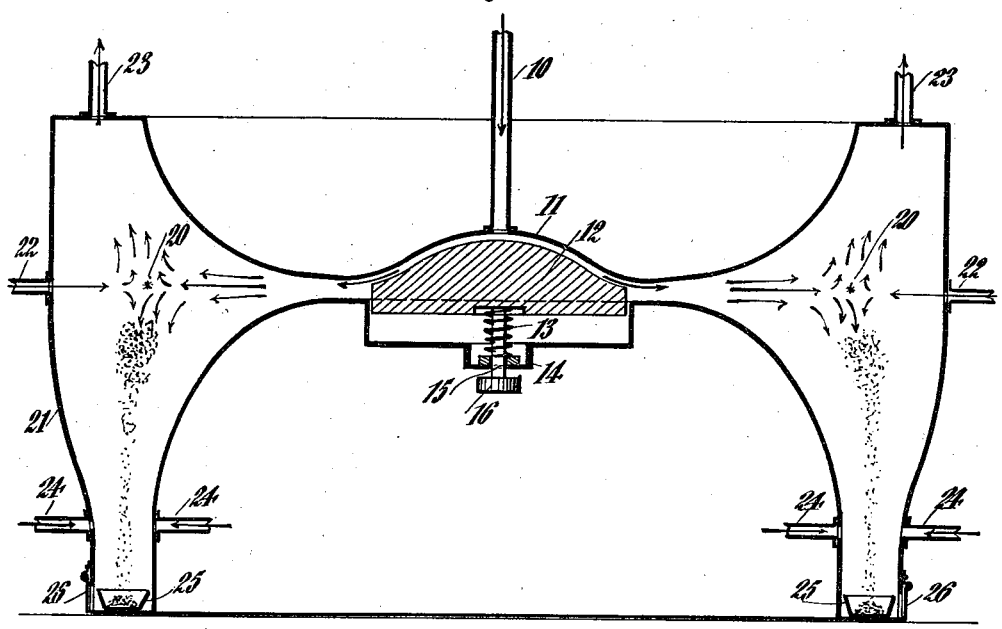
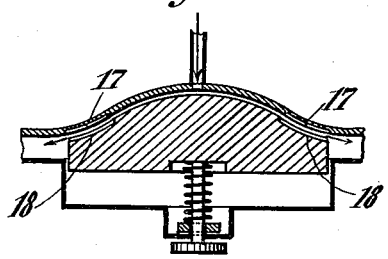
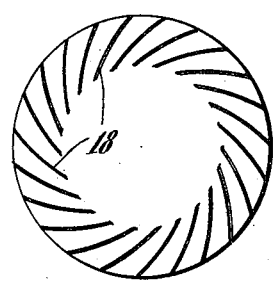
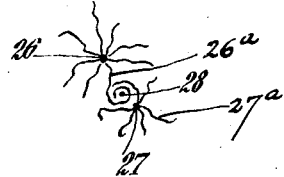
INVENTOR
Clarence S. Stevens
BY C. P. Goepel
ATTORNEY

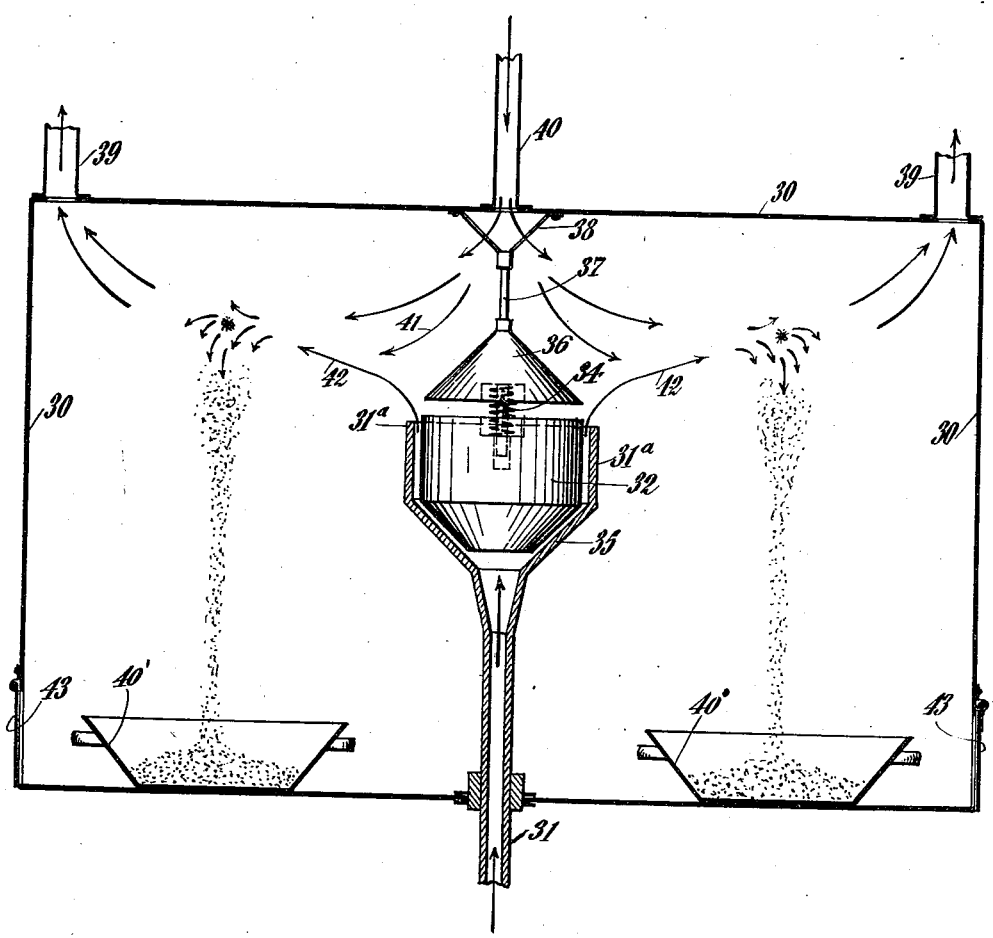

Patented May 1, 1923.

1,453,859

UNITED STATES PATENT OFFICE.

CLARENCE S. STEVENS, OF SHEBOYGAN, WISCONSIN.

MILK PRODUCT AND PROCESS OF MAKING THE SAME.

Application filed August 7, 1918. Serial No. 248,674.

*To all whom it may concern:*

Be it known that I, CLARENCE S. STEVENS, a citizen of the United States, and a resident of Sheboygan, in the county of Sheboygan and State of Wisconsin, have invented certain new and useful Improvements in Milk Products and Processes of Making the Same, of which the following is a description.

This invention relates to milk products and more particularly to milk products in powdered state, and the object of the invention is to provide an improved milk powder and also to provide an improved process of making the same.

Heretofore difficulty has been encountered in the use of milk powders containing butter fat in that after a short time milk powders containing butter fat become rancid. In other cases in which the milk is impacted against plates having a high temperature, and the milk is thereby dried, the solubility of the casein in the use of the powder is affected. So, for instance, powders made according to the certain known processes are found, when mixed with water or cocoa or the like, to have the constituents of the powder float in the mixture rather than dissolving therein. Other objections exist against the use of whole milk powders which have practically prevented the general use of such powders and in consequence thereof only skim milk powders found a sale and even the extent of this sale has been relatively restricted.

A further difficulty encountered in processes herebefore used has been to secure rapid and efficient drying without the use of excessive temperatures. One object of this invention is to overcome this difficulty by the use of dry superheated steam as the drying agent.

Steam has a specific heat of 0.47 calories per gram while air has a specific heat of only 0.24 calories per gram, or approximately half the specific heat of steam. Consequently, one unit of weight of steam over a given range of temperature is capable of absorbing twice as much water as the same weight of air. Therefore, other conditions being equal, steam is capable of drying milk twice as fast as air, or, of accomplishing twice as much drying for a given weight of drying agent used. Steam is thus a more efficient drying agent than air or other gases and the rapidity of its drying and greater capacity for absorbing moisture before becoming saturated enables the making of a better product at less expense.

A further advantage of the steam drying in the manner as hereinafter more fully described, is the coagulation of a protective coating of milk albumin around the fat globules while the product is in the atomized condition. This protective coating of albumin tends to prevent the contact of the fat with air and so makes the product more stable against rancidity.

I have illustrated in the accompanying drawings several forms of apparatus which may be successfully used in carrying out the present invention, wherein similar reference characters designate corresponding parts throughout the several views and in which, Figure 1 is a central vertical section of one form of apparatus;

Figure 2 is a detail section of the homogenizing unit;

Figure 3 is a plan view of the rotary member of said homogenizing unit;

Figures 4 and 5 are detail diagrammatic views illustrating the action which takes place at an intermediate stage of the process; and Figure 6 is a view similar to Figure 1 illustrating a slightly modified form of the apparatus.

This invention has for its object to overcome many of the objections heretofore existing as will be found from the description which follows:

A specific mode of carrying out my process is the following:

Either milk that is whole milk or skim milk or milk compound consisting of skim milk and substituted fat as cocoanut fat substantially free from fatty acids, is subjected to homogenization in the presence of the drying medium.

In one embodiment of my invention, I use an apparatus as shown in Figure 1, in which the liquid to be dried is passed through the supply pipe 10 and then forced under pressure against the members of an homogenizing unit. This homogenizing unit consists of a base, or a rigid member 11, and a yielding member 12 which is held in position against the rigid member 11 by the spring 13. This spring 13 abuts against the yieldable member 12 and against the abutment 14 and surrounds a guiding stem 15. The guiding stem 15 is provided with a collar or abutment 16. The action of the spring 13 continually presses the yieldable member 12 against the rigid member 11, but the yieldable member 12 is capable of yielding against the action of the spring 13 when the liquid to be dried is forced in between the rigid member 11 and the yieldable member 12. The yieldable member 12 as also the rigid member 11, is provided at its circumferential portion with a series of grooves which are capable of registering with each other, these grooves being indicated in Figure 2 by the character 17 in the rigid member and by the character 18 in the yieldable member. Preferably these grooves are arranged in an inclined manner on the face of the rigid member and on the face of the yieldable member instead of being radial to these members. The object of this inclination is to cause the yieldable member to be rotated by the force of the liquid passing between the members, and for this purpose the stem 15 is permitted to rotate in its abutment 14. As the liquid is pressed between the homogenizing members and passes through the grooves, the fat globules of the liquid are broken up into very fine and uniform particles, that is, they are thoroughly homogenized, and in this thoroughly homogenized condition pass out of the homogenizing members in a more or less radial direction and in a more or less horizontal plane. The centrifugal action of the yieldable and rotating member 12 assists in ejecting the homogenized liquid out of the homogenizing unit. As the liquid is thus ejected it, due to its velocity and against the resisting action of the medium into which it is thrown, divides itself into a very fine vapor of nebulous character. At the approximate point of greatest vaporization which is approximately indicated by the character 20, this vapor is met by a vapor of dry or superheated steam, which steam is injected into the casing 21 by a series of inlet pipes 22 which are circumferentially arranged around the casing 21. The heat of the steam immediately sucks out of the milk used, all the moisture and this moisture then forms part of the steam and increases its pressure, and as a result of this the increased pressure will cause the moisture laden steam to pass upwardly and out of the casing through the outlet pipes 23, which are suitably arranged circumferentially around the upper part of the casing 21. Check valves may be provided for the purpose of preventing at any time any ingress of atmospheric air, though this is not likely, due to the pressure of the steam. The vaporized milk having its moisture extracted, forms itself into a dry powder and this drops toward the bottom of the casing 21, and during its passage to the bottom is met with a stream of cold dry air, the object of this being to chill the fat particles. The cold air is injected through circumferentially arranged inlet pipes 24 into the lower portion of the casing 21 and assists also when it flows toward the upper portion of the casing in reducing the temperature so as to prevent the temperature due to the incoming steam from becoming too high. The dried powder with its chilled fat is then collected in pans 25, in the lower portion of the casing which pans may be suitably removed from the casing through doors 26 and then the powder may be packed.

The action of the steam has a tendency to first coagulate the albumen and then by the coagulation of the albumen cause the coagulated albumen to entrain the fat globules and shortly thereafter, as is shown in Figure 4, the albumen coagulates around fat globules as nucleii, a nucleus of the albumen being indicated by the character 26 in Figure 4, and the fat globules entrained by the coagulated albumen being indicated by the character 28. Thereby the fat globules are enveloped by the coagulated albumen and the casein 27, and as these particles become drier the coagulated albumen and the casein break off or split, but the entrained thread or thistles of the coagulated albumen and the casein having completely enveloped the small homogenized fat globules, maintain such envelopment as the fat globules so enveloped gradually become dry.

The succeeding chilling action of the cold air chills these fat globules while being enveloped. This envelopment in the use of the dry powder prevents the air from attacking the fat globules and thereby assures a long life to the dry product since the fat not being affected by the atmospheric air during the use of the dry powder will not become rancid, which butter fat has a tendency to do. When the product is used, however, the water or coffee or cocoa which is used to dissolve the dry powder readily dissolves the enveloping envelope and if this dissolving fluid is warm it will readily melt the fat globules which will escape due to the dissolving of the envelope of dried albumen and casein. Thus, by the protective covering of the dry constituents of the milk around the fat globules which are very small and uniformly homogenized, a very satisfactory dry powder may be produced.

It will be understood that the temperature at which the steam enters the drying chamber is dependent in part on the rate of flow of the milk. Thus a slow flow of the milk will necessitate a relatively low temperature of the superheated steam, while a more rapid flow of the milk will permit of a higher initial temperature of the steam. This is due to the fact that as the moisture in the milk is evaporated, the temperature of the superheated steam is gradually cooled. Generally, I have found in practice that the steam may enter the drying chamber at a temperature of about 260° F. It is only required that the steam shall cool to about 240° F. by the time half of the water in the milk has been evaporated. The temperature of the steam as it leaves the drying chamber is as near 212° F. as the skill of the operator in manipulating the apparatus can produce. Generally, the temperature may be kept within 5° to 10° of 212° without danger of lowering to a point below 212°. It is, of course, evident that 212° is the least permissible temperature of the outgoing steam, since any temperature below this point would cause condensation.

It is important that the dehydrated and albumen enveloped fat globules of the milk shall be cooled during precipitation below the temperature at which they would coalesce upon contact with each other. Therefore, the body of relatively cool air is maintained below the temperature at which the incoming steam acts upon the homogenized milk. However, the steam is at such temperature and the pressure in the steam receiving chamber is such that the cooler zone of air will not cause condensation of the steam before it has subserved its purpose of coagulating the albumen and casein of the milk around the fat globules.

Another embodiment of my invention consists in the form shown in the drawings of Figure 6.

In this case the casing 30 is provided at its central portion with a supply pipe 31, which may be used for whole milk, for skim milk, for milk with a substituted fat, or any other liquid containing albumen or the like to be dried just as in the case of the embodiment just described in connection with Figure 1. In this embodiment, however, the supply pipe 31 enters the casing 30 from the bottom of the casing and has at its end a homogenizing unit of the form shown in Figure 6. The yieldable member 32 of this homogenizing unit is again spring actuated by the spring 34 and acts against the rigid member 35 of the homogenizing unit. The spring is interposed between the yieldable member 32 and a rigid member 36. This rigid member 36 is supported by a suspending rod 37 which is suitably secured to a casing 30. The member 36 is conical in shape. The supporting rod 37 is provided with an extending portion 38, preferably 3 or 4 in number and arranged in triangular fashion. Steam is caused to enter the steam supply pipe 40 and passes into the casing 30, the three or four rods 38 permitting a free passage of this incoming superheated steam. Suitable outlet pipes for the saturated moisture laden superheated steam are provided, which outlet pipes are indicated by the character 39. Suitable collecting pans 40' are provided for the dry powder.

As the milk or similar liquid to be dried passes through the supply pipe 31, it encounters the homogenizing unit 32-35 and having its fat broken up into fine particles in a completely homogenized condition, it passes out of the supply pipe 31 at its end portion 31ª with a tendency to form a cylindrical shape. But the superheated steam passing into the casing in the direction of the arrow 41 meets this liquid in cylindrical shape and blows it outwardly toward the outer portion of the casing 30, substantially in the direction of the arrow 42. In order to bring this action about and at the same time provide means to prevent the hot steam from heating the homogenizing unit, the member 36 is arranged in a conical shape so as to, on the one hand, deflect the incoming steam and, on the other hand, prevent the heat of the steam from heating the homogenizing unit. The liquid to be dried being flung outwardly by the steam is formed into a nebulous vapor and at the same time the dry or superheated steam extracts from the liquid to be dried, the moisture of the liquid and then absorbing such moisture the steam passes out of the outlet pipes 39. The dried milk in a manner described heretofore then drops out into the collecting pans 40 and may be packed in the usual manner by taking the pans out of the doors 43. Suitable chilling arrangements may also be provided either in the casing 30 or by passing the contents of the pans 40 through a chilling atmosphere.

Suitable arrangements may also be made for using the superheated steam over and over again by a conduit (not shown) connected with the inlet 22 and exhaust 23 of Figure 1.

I have described several embodiments of the process forming part of my invention and also the product, and the advantage thereof will immediately become apparent.

Of course, changes may be made in the embodiments without departing from the spirit of my invention as defined in the appended claims.

Having thus described my invention I claim as new and desire to secure by Letters Patent:

1. The process of making a powdered milk product, which consists in homogenizing the milk and then immediately thereafter and before precipitation of the homogenized milk particles, subjecting the homogenized milk to the action of steam at atmospheric pressure, to thereby evaporate the moisture of the homogenized milk and coagulate the albumen of the milk in the form of a dry enveloping sheath around the fat globules of the milk.

2. The process of making a milk product which consists in homogenizing the milk and dehydrating the homogenized milk particles while in suspension to thereby envelop the fat globules in the other milk constituents, and finally subjecting the dehydrated milk constituents to the action of a chilling agent during precipitation thereof.

3. The process of making powdered milk which consists in first homogenizing the liquid milk, and then immediately thereafter subjecting the homogenized milk to the action of superheated steam to thereby dry the fat globules and cause the same to be enveloped in the other milk constituents.

4. The process of making powdered milk which consists in homogenizing liquid milk and then directing the homogenized milk into the path of a current of superheated steam to thereby dry the fat globules and cause the same to be enveloped in the other milk constituents.

5. The process of making powdered milk which consists in homogenizing the milk and immediately thereafter and before precipitation of the homogenized milk particles, dehydrating the homogenized milk and coagulating the albumen of the milk in enveloping relation around the fat globules of the milk.

6. The process of making powdered milk which consists in first homogenizing liquid milk, and simultaneously subjecting the homogenized milk to the action of superheated steam and precipitating the milk constituents in dry form, and finally subjecting the dry milk constituents during the precipitation to the action of a chilling agent.

7. In the process of making powdered milk, that step which consists in directing the milk constituents from a homogenizer into the path of a current of superheated steam to thereby cause the simultaneous drying of the fat globules and the coagulation of milk albumen in the form of an enveloping coating upon said globules.

8. In the process of making a powdered milk product, that step which consists in dehydrating fluid milk immediately after the homogenization thereof and before precipitation of the milk particles, by subjecting the homogenized milk to the action of superheated steam.

In testimony that I claim the foregoing as my invention, I have signed my name in presence of two subscribing witnesses.

CLARENCE S. STEVENS.

Witnesses:
PAUL R. McKEE,
H. MURRAY.